United States Patent
Marchese-Ribeaux

(10) Patent No.: US 11,362,812 B2
(45) Date of Patent: Jun. 14, 2022

(54) METHOD OF END TO END SECURING OF A COMMUNICATION

(71) Applicant: Atos Integration, Bezons (FR)

(72) Inventor: Alexandre Marchese-Ribeaux, Pontoise (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/958,230

(22) PCT Filed: Dec. 21, 2018

(86) PCT No.: PCT/EP2018/086828
§ 371 (c)(1),
(2) Date: Jun. 26, 2020

(87) PCT Pub. No.: WO2019/129757
PCT Pub. Date: Jul. 4, 2019

(65) Prior Publication Data
US 2020/0351080 A1 Nov. 5, 2020

(30) Foreign Application Priority Data
Dec. 27, 2017 (FR) ....................................... 1701381

(51) Int. Cl.
*H04L 9/06* (2006.01)
(52) U.S. Cl.
CPC .................. *H04L 9/0656* (2013.01)
(58) Field of Classification Search
CPC ......... H04L 9/0656; H04L 9/08; H04L 63/06; H04W 12/04
See application file for complete search history.

(56) References Cited

U.S. PATENT DOCUMENTS

| | | | |
|---|---|---|---|
| 8,024,560 B1* | 9/2011 | Alten | .................. H04L 63/0428 713/156 |
| 2003/0005280 A1* | 1/2003 | Bobde | ................... H04L 63/123 713/150 |
| 2009/0126001 A1 | 5/2009 | Krantz et al. | |
| 2010/0138660 A1 | 6/2010 | Haynes et al. | |
| 2010/0153726 A1 | 6/2010 | Liu et al. | |
| 2011/0268277 A1* | 11/2011 | Kurokawa | .......... H04W 12/069 380/270 |
| 2016/0234197 A1 | 8/2016 | Näslund et al. | |

OTHER PUBLICATIONS

International Search Report of the International Searching Authority for PCT/EP2018/086828 dated Feb. 13, 2019.
English translation of International Search Report of the International Searching Authority for PCT/EP2018/086828 dated Feb. 13, 2019.

* cited by examiner

*Primary Examiner* — Baotran N To
(74) *Attorney, Agent, or Firm* — Arc IP Law, PC; Joseph J. Mayo

(57) ABSTRACT

The aim of the invention is to strengthen the security of secure voice and/or video communications established through a network of Internet type. The security of these communications, which are based on the use of the SRTP protocol, is strengthened by the invention which makes it possible, without significantly modifying the protocols, to use better quality session keys produced by a security server of HSM type. These keys are configured by an intermediate server of SIP proxy type when establishing the communication.

11 Claims, 2 Drawing Sheets

METHOD OF END TO END SECURING OF A COMMUNICATION

FIELD OF THE INVENTION

The field of the invention is the field of end-to-end securing of a communication.

End-to-end securing means a communication during which, when a message is transmitted encrypted, it is received encrypted as it was transmitted.

The field of the invention is also that of voice and/or video communications established through an Internet-type network, i.e. a network subject to message interception being carried out.

The field of the invention is also that of securing communications in the areas in which law enforcement entities operate, whether these enforcement entities are civil or military.

PRIOR ART

It is known from the prior art how to establish end-to-end encrypted communications, for example using the session initiation protocol SIP. For establishing such a communication between two items of terminal equipment, each item of terminal equipment produces a session key to be used to decrypt the messages transmitted by said item of terminal equipment. For a communication between two items of terminal equipment, there are therefore at least two keys, one for each item of terminal equipment.

In practice, there are as many session keys as there are items of terminal equipment, multiplied by the number of streams.

Thus, for a video call, the calling terminal produces two session keys:
A first key for encrypting the audio stream it is transmitting;
A second key for encrypting the video stream it is transmitting.

The called terminal does the same. For establishing the communication, there are therefore four session keys to be exchanged to enable an item of terminal equipment to decrypt the messages transmitted by the other item of terminal equipment.

The problem posed arises from the fact that the session keys produced by the items of terminal equipment can be predicted. An attacker capable of predicting these keys is therefore able, if they intercept the messages, to access the content of the messages exchanged between the terminals.

This problem is known, as is a solution wherein an intermediate server, also referred to as SIP proxy, substitutes the keys produced by the terminals with keys produced by itself.

For example, if a first terminal invites a second terminal to establish a secure communication, the invitation message comprises a first key. This invitation message is processed by the SIP proxy so as to replace the first key with a second, more secure, key. In this case, the messages transmitted by the first terminal will be:
Encrypted by the first terminal with the first key;
Decrypted by the proxy server;
Encrypted by the server with the second, more secure, key;
Transmitted to the second terminal.

The solution of the prior art therefore secures the routing of the messages transmitted by the SIP proxy, but not the messages transmitted by the terminals.

An attacker can therefore still access all the messages, as long as they are able to intercept the messages transmitted by the two terminals.

With the solution of the prior art, it is therefore necessary to attack both terminals, and not just one, in order to access all the contents of a communication.

In the prior art, secure communications therefore remain vulnerable to attackers who know how to predict the session keys produced by the SIP user agents.

Document US20100138660 also describes a process for end-to-end securing of a communication, which is based on storage of the devices wishing to communicate on an intermediate server (FIG. 5), the storage being prior to the communication, which enables the devices to receive a TSK key in exchange for a request made by them and containing a key-generating value.

Next, during the communication request, the intermediate server via which the messages pass adds, to the invitation and acceptance messages from the devices, an encrypted MSK key which can be decrypted by the communicating devices using their previously received TSK key.

A disadvantage of this solution of the prior art emerges from the number of steps and from the need for a step prior to the communication request.

DISCLOSURE OF THE INVENTION

The invention makes it possible to overcome these problems by enabling an intermediate server, the SIP proxy, to produce all the keys that will be used during data exchanges. Thus, session keys will no longer be predictable, and the security of the exchanges is thereby strengthened.

With this in mind, the object of the present invention is a process for end-to-end securing of a communication between at least one first item of terminal equipment and a second item of terminal equipment, the communication being established using a session initiation protocol making it possible to exchange session keys, each item of terminal equipment using a session key to encrypt the communication data that it is transmitting, the session keys being exchanged securely via an intermediate server using a security certificate, characterized in that the process implements the following steps, carried out by the intermediate server:

Receipt of a first invitation message, the first item of terminal equipment inviting the second item of terminal equipment, the first invitation message comprising at least one descriptive attribute of a first session key;

Production of a second invitation message, the first item of terminal equipment inviting the second item of terminal equipment, the second invitation message comprising:

A first session key, the first session key being configured by the intermediate server according to the descriptive attribute of the first session key, the first session key being intended to be used to encrypt/decrypt the data transmitted by the first item of terminal equipment;

At least one second session key, the second session key being configured by the intermediate server, the second session key being intended to be used to encrypt/decrypt the data transmitted by the second item of terminal equipment;

Transmission of the second invitation message;

Receipt of a first acceptance message, the second item of terminal equipment accepting the invitation;

Production of a second acceptance message, the second item of terminal equipment accepting the invitation, the second acceptance message comprising:

The first session key;

The at least second session key

Transmission of the second acceptance message.

Thus, the process according to the present invention does away with the step of prior storage of the communicating equipment on the server, by enabling the server to produce and configure 2 keys itself and to send them in the secure invitation and acceptance messages.

In addition to the main features mentioned in the previous paragraph, the process according to the invention may have one or more of the following additional features, considered individually or according to technically possible combinations:

The first key or the second key are configured by a request to a security server configured to implement a random sequence generator, the keys being produced using said random sequence generator;

A request to the security server makes it possible to obtain a bundle of session keys, the bundle is stored by the intermediate server in a first key buffer, the first key and the second key being configured using the contents of the first buffer, each key stored in the first buffer being single-use;

The intermediate server comprises a second key buffer, the second key buffer is supplied by a request to the security server, the intermediate server uses the first key buffer as long as it contains keys then uses the second buffer and fills the first one again by a request to the security server, the first and second buffers being used cyclically;

The protocol for establishing the session is the SIP protocol;

The protocol for establishing the session is the SIP protocol, and:

The first session key is sent to the first item of terminal equipment as a value of an attribute named a=hsmkey;

The second session key is sent to the first item of terminal equipment as a value of an attribute named a=crypto;

The first session key is sent to the second item of terminal equipment as a value of an attribute named a=crypto;

The second session key is sent to the second item of terminal equipment as a value of an attribute named a=hsmkey;

The communication is a voice communication;

The communication is a video communication.

BRIEF DESCRIPTION OF THE FIGURES

Other features and advantages of the invention will emerge from reading the following description, with reference to the appended figures, wherein.

For greater clarity, identical or similar elements are identified by identical reference symbols in all the figures.

The invention will be better understood upon reading the following description and examining the accompanying figures. Said figures are presented by way of indication and in no way limit the invention.

DETAILED DESCRIPTION

Figure 1:
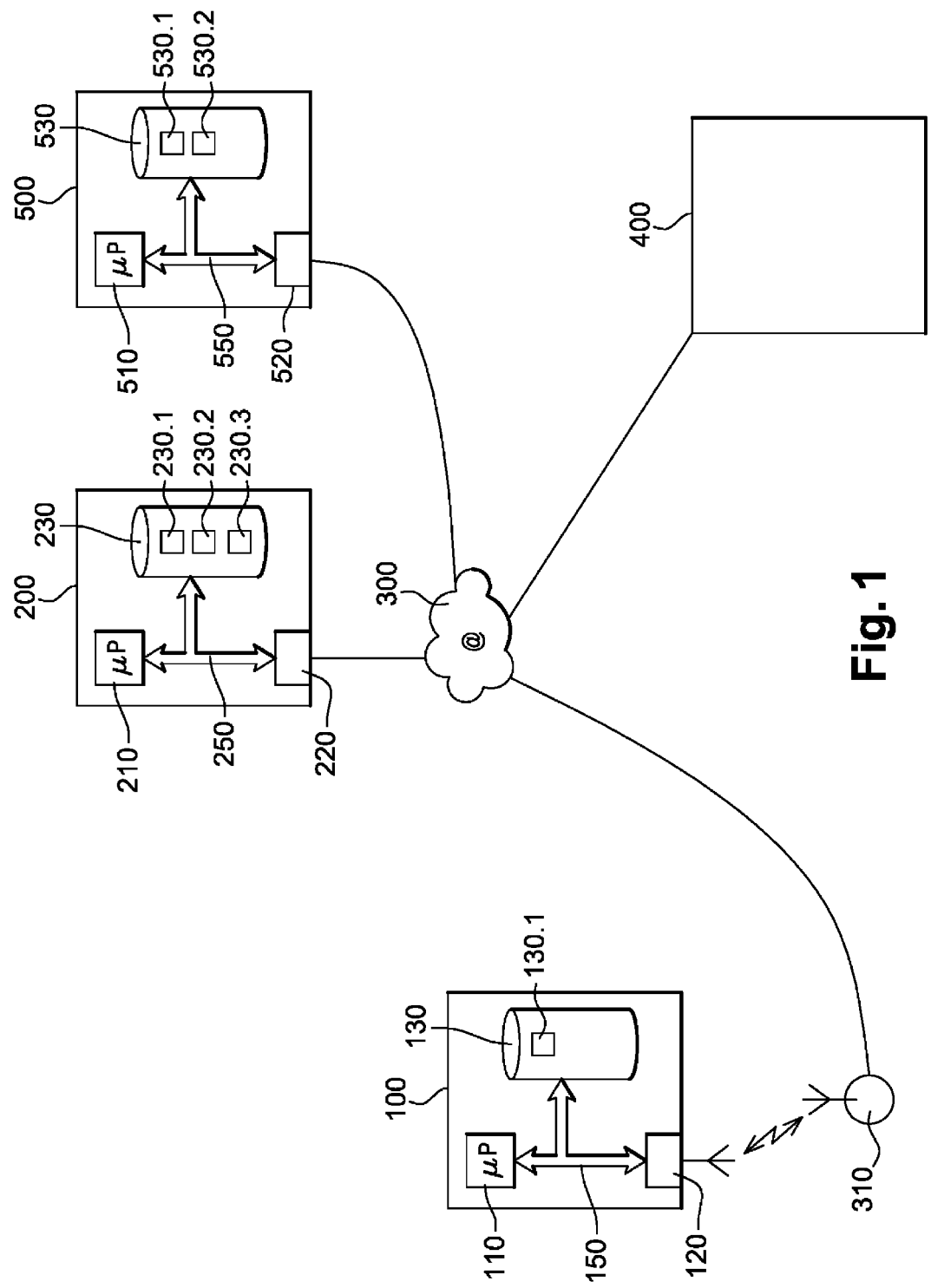
FIG. 1 shows an illustration of an infrastructure enabling the implementation of the securing process according to the invention.

FIG. 1 shows an intermediate server 200. The intermediate server 200 is also referred to as a proxy server. In the case of using the SIP protocol for establishing communication (SIP: Session Initiation Protocol), it may also be called a SIP proxy.

FIG. 1 shows that the intermediate server 200 comprises:

A microprocessor 210;

A communication interface 220. Such a communication interface is for example an Ethernet card, an InfiniBand card, a Wi-Fi card, etc. The communication interface 220 enables the intermediate server 200 to communicate with other devices;

Storage means 230. Storage means are for example hard drives, solid-state drives, a disk grid, etc. These means are local or remote.

More generally, for other devices, the storage means can also be produced with flash memory or EPROM-type components.

FIG. 1 shows that the microprocessor of the intermediate server, the communication interface of the intermediate server and the storage means of the intermediate server are interconnected by a bus 250.

FIG. 1 shows that the storage means 230 of the intermediate server comprise several zones, including at least:

One zone 230.1 for securing a communication. This zone for securing a communication comprises instructions codes which, when they are executed by the intermediate server, lead to the latter implementing the process according to the invention;

One key buffer zone 230.2 of use in a variant of the invention for managing communication session keys.

One certificate zone 230.3 comprising an identification certificate of the intermediate server for the use of an encryption protocol of the SSL (Secure Socket Layer) or TLS (Transport Layer Security) type.

FIG. 1 shows that the intermediate server 200 is connected to a public network 300, for example the Internet. It is noted that the invention is also effective if the public network is not the Internet but a network compatible with protocols used on the Internet, in particular the protocols named IP and the associated transport protocols.

When an action is attributed to a device, it is actually performed by a microprocessor of the device controlled by instruction codes stored in a memory of the device. If an action is attributed to an application, it is actually performed by a microprocessor of the device in a memory in which the instruction codes corresponding to the application are stored. When a device or an application transmits a message, this message is transmitted via a communication interface of said device or of said application. A message comprises at least one destination address field, a sender address field and a payload. These principles apply whether the device is real or virtual.

FIG. 1 shows a first item of terminal equipment 100. The first item of terminal equipment comprises:

A microprocessor 110;

A communication interface 120. In the case of an item of terminal equipment, the communication interface is, for example, an interface configured to be able to communicate over a mobile telephony network, in particular in data mode;

Storage means 130.

FIG. 1 shows that the microprocessor of the first item of terminal equipment, the communication interface of the first item of terminal equipment and the storage means of the first item of terminal equipment are interconnected by a bus 150.

FIG. 1 shows that the first item of terminal equipment 100 is connected to a base station 310 of a mobile network, not shown. The base station 310 is connected to the public network. The first item of terminal equipment is therefore connected to the public network.

FIG. 1 shows that the storage means 130 of the first item of terminal equipment comprise several zones, including at least:

A SIP agent zone 130.1 comprising instruction codes to enable the item of terminal equipment to carry out communications according to the SIP protocol.

In practice, the first item of terminal equipment is a smartphone, on which communication software compatible with the SIP protocol has been installed. Such a telephone is also called a SIP telephone or SIP phone. Such software can also be installed on a tablet or personal computer. The installation of such software means that the device on which it is installed can be referred to as a user agent.

In the context of use of a communication protocol, reference is made to a user agent, or UA. A user agent is a program executed by an item of terminal equipment to establish and produce a communication according to said communication protocol. User agents are connected through a proxy server.

In the literature, the user agent, which is software, is often mistaken for the user terminal, which is hardware. The combination of hardware and software is also referred to as an item of terminal equipment.

FIG. 1 shows a second item of terminal equipment 400 which is also a user agent of the same type as the first item of terminal equipment. That is to say that the first item of terminal equipment and the second item of terminal equipment can establish a communication with one another.

FIG. 1 shows a security server 500. The security server 500 comprises:

A microprocessor 510;

A communication interface 520 making it possible to connect the security server to the public network 300. The security server is therefore able to communicate with the intermediate server;

Storage means 530.

FIG. 1 shows that the microprocessor of the security server, the communication interface of the security server and the storage means of the security server are interconnected by a bus 550.

In a variant of the invention, the intermediate server comprises a second communication interface to be able to communicate with the security server without going through the public network 300. In this variant, the security server is isolated on a private network and hence protected.

FIG. 1 shows that the storage means 530 of the security server comprise several zones, including at least:

One random number-generating zone 530.1 comprising instruction codes, the execution of which makes it possible to obtain safe, i.e. non-predictable, random numbers.

One session key-generating zone 530.2 comprising instruction codes, the execution of which makes it possible to produce session keys, i.e. character strings of a predetermined length, by using the random number generator described previously. A session key is conventionally used as a symmetric encryption key for message exchanges.

In practice, the security server is comparable to an HSM server, also simply named HSM. HSM stands for Hardware Security Module. It is noted that this may be a physical component of the intermediate server. However, in the intermediate server has a public communication interface, this is not the preferred solution.

Figure 2:
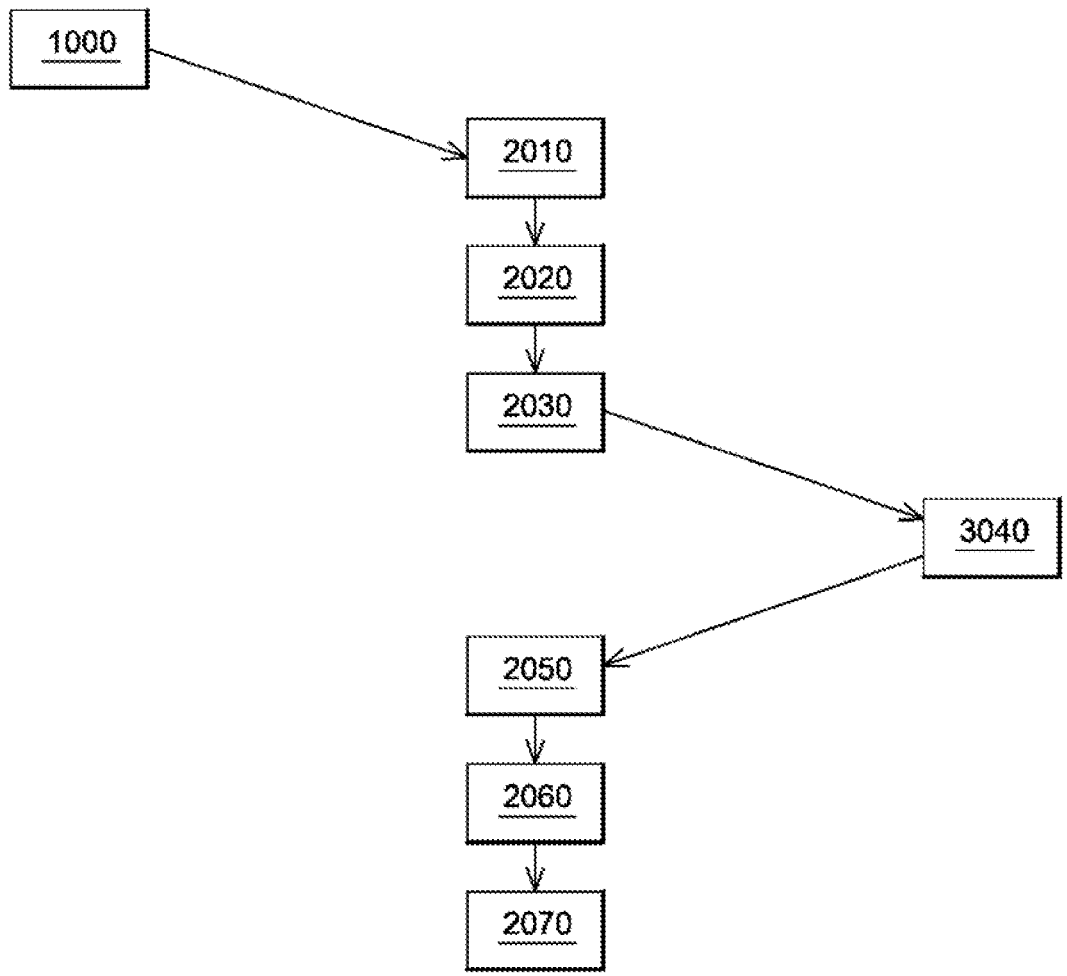
FIG. 2 shows an illustration of steps of the securing process according to the invention.

FIG. 2 shows a preliminary step 1000 wherein a user of the first item of equipment uses the first item of terminal equipment to transmit a call with the aim of inviting a user of the second item of terminal equipment to establish a voice or video communication using the SIP protocol. This is a preliminary dialing step 1000. Such a step is, for example, the selection of a contact from an electronic address book. The implementation by a user of a dialing step causes the production, then the transmission to the intermediate server, of a first invitation message. The payload of this first invitation message comprises at least the following line:

a=hsmkey:1 conf

This is a line according to the SIP protocol, which can be broken down as follows:

a=hsmkey means that there is a wish to establish a secure communication, 1 means that this is a first proposition conf is the contract of the first proposition. conf is also considered to be a session key attribute, that is an attribute, the value of which designates the properties of the session. conf may assume several values depending on the encryption desired during the session. Typical values are:

AES_CM_128_HMAC_SHA1_32, or

AES_CM_128_HMAC_SHA1_80.

In a step 2010 of receipt of the first invitation message, the intermediate server receives the first invitation message produced by the first item of terminal equipment. In the step of receipt of the first invitation message, the intermediate server analyzes the payload of the message received and finds therein a line of the type:

a=hsmkey:1 conf

This means that the server must drive the establishment of a secure communication between the first item of terminal equipment and the second item of terminal equipment.

The intermediate server then moves to a step 2020 of production of a second invitation message to invite the second item of terminal equipment on behalf of the first item of terminal equipment. The payload of this second invitation message comprises at least the following lines:

a=crypto:1 conf inline:key_value_1 a=hsmkey:1 conf inline:key_value_2

The line beginning with a=crypto stipulates that the item of terminal equipment receiving the invitation will receive encrypted data transmitted by the inviter using, for decryption, the algorithm specified by conf and using a first session key, the value of which is key_value_1.

The line beginning with a=ksmkey stipulates that the item of terminal equipment receiving the invitation must transmit, to the inviter, encrypted data using, for encryption, the algorithm specified by conf and using a second session key, the value of which is key_value_2.

Once the second invitation message has been produced, the intermediate server sends it, in a step 2030 of transmission of the second invitation message, to the second item of terminal equipment.

In a step 3040 of receipt of an invitation message, the second item of terminal equipment receives the second invitation message, processes it, produces a first acceptance message that it transmits to the intermediate server.

In a step 2050 of receipt of a first acceptance message, the intermediate server receives the first acceptance message produced by the second item of terminal equipment. The payload of the first acceptance message comprises at least a line of the type:

a=crypto:1 conf inline:key_value_2

This line means that the second item of terminal equipment, the guest terminal, agrees to use the algorithm specified by conf with a key, the value of which is key_value_2, to encrypt the messages that it is transmitting bound for the first item of terminal equipment, the inviting terminal.

The intermediate server then moves to a step 2060 of production of a second acceptance message.

The payload of this second acceptance message comprises at least the following lines:

a=crypto:1 conf inline:key_value_2
a=hsm key:1 conf inline:key_value_1

The line beginning with a=crypto stipulates that the item of terminal equipment receiving the acceptance will receive encrypted data transmitted by the guest using, for decryption, the algorithm specified by conf and using the second session key, the value of which is key_value_2.

The line beginning with a=ksmkey stipulates that the item of terminal equipment receiving the acceptance must transmit, to the guest, encrypted data using, for encryption, the algorithm specified by conf and using the first session key, the value of which is key_value_1.

Once the second acceptance message has been produced, the intermediate server transmits it, in a step 2070 of transmission of a second acceptance message, to the first item of terminal equipment.

From this point on, each item of terminal equipment knows the information enabling it to exchange encrypted data with the other using the SRTP protocol, that is the secure RTP protocol. The RTP protocol is a protocol used for exchanging voice and image streams. RTP stands for Real-time Transport Protocol.

The data transmitted by the second item of terminal equipment is intended to be received by the first item of terminal equipment. Therefore, the second session key can also be considered as being intended for encrypting/decrypting the data transmitted to the first terminal.

By virtue of the invention, all the session keys used are configured by the intermediate server. The keys are configured in step 2020 of production of a second invitation message. Configured is intended to mean produced and written in the message. The production can be local, as would be carried out by a user agent in the case of the prior art, strengthened local, using a dedicated component, or delegated to a security server.

In the case in which the production is delegated to a security server, for example the security server 500, the intermediate server transmits a session key request message to the security server. These requests are standardized according to protocol PKCS #11.

In a variant of the invention, the keys are not requested one-by-one but in bundles, and are managed in a dual buffer. The dual buffer is stored in zone 230.2 for buffers of the intermediate server. The dual buffer comprises two buffers: one active, one pending. In the present case, a buffer is a memory area structured to store session keys. The reading of one of the session keys deletes it from the buffer. The operation in the invention is as follows:

On start-up of the intermediate server, both buffers are filled by the intermediate server which transmits requests to the security server. One of the two buffers is designated as the active buffer, the other becoming the pending buffer.

When the intermediate server requires a session key, it reads it from the active buffer. If the active buffer becomes empty afterwards, then:

The active buffer and the pending buffer swap roles;

The intermediate server transmits requests to the security server to obtain session keys enabling it to fill the buffer which has become the pending buffer.

The buffers are therefore used according to a cycle in which each buffer is cyclically active and pending.

This method makes it possible for the intermediate server to avoid latencies induced by exchanges with the security server. This result can also be obtained with a single rotating buffer, the refilling of which is controlled by a minimal number of keys that such a rotating buffer has to contain.

In practice, the exchanges between the items of terminal equipment and the intermediate server and the exchanges between the intermediate server and the security server occur securely. This securing is obtained by using the SSL or TLS protocol or an equivalent. To this end, the intermediate server has at least one certificate to enable these secure connections.

The invention therefore makes it possible to strengthen the security of communications established according to the SIP protocol. This strengthening is obtained by the strengthening of the session keys used, in particular for the SRTP protocol. The invention is based on existing elements of the SIP protocol, without needing to modify it, and it is therefore easy to use.

What is claimed is:

1. A process for end-to-end securing of a communication between at least one first item of terminal equipment and a second item of terminal equipment, the communication being established using a session initiation protocol making it possible to exchange session keys, wherein each item of said at least one first item of terminal equipment and said second item of terminal equipment uses a session key to encrypt communication data that said each item of said at least one first item of terminal equipment and said second item of terminal equipment is transmitting, wherein the session keys are exchanged securely via an intermediate server using a security certificate, wherein via the intermediate server, the process comprising:

receiving a first invitation message of the at least one first item of terminal equipment inviting the second item of terminal equipment, wherein the first invitation message comprises at least one descriptive attribute of a first session key;

producing a second invitation message of the at least one first item of terminal equipment inviting the second item of terminal equipment, wherein the second invitation message comprises the first session key, the first session key being configured by the intermediate server according to the at least one descriptive attribute of the first session key, the first session key being configured to be used to encrypt and decrypt the communication data transmitted by the at least one first item of terminal equipment;

at least one second session key, the at least one second session key being configured by the intermediate server, the at least one second session key being configured to be used to encrypt and decrypt the communication data transmitted by the second item of terminal equipment;

transmitting the second invitation message;

receiving a first acceptance message of the second item of terminal equipment accepting the second invitation message;

producing a second acceptance message of the second item of terminal equipment accepting the second invitation message, wherein the second acceptance message comprises
the first session key;
the at least one second session key; and
transmitting the second acceptance message.

2. The process for end-to-end securing of a communication according to claim 1, wherein the first session key or the at least one second session key are configured by a request to a security server configured to implement a random sequence generator, wherein the first session key and the at least one second session key are produced using said random sequence generator.

3. The process for end-to-end securing of a communication according to claim 2, wherein the request to the security server allows obtaining a bundle of session keys, wherein the bundle of session keys is stored by the intermediate server in a first key buffer, wherein the first session key and the at least one second session key are configured using contents of the first key buffer, wherein each key stored in the first key buffer are single-use.

4. The process for end-to-end securing of a communication according to claim 3, wherein the intermediate server comprises a second key buffer, wherein the second key buffer is supplied by another request to the security server, wherein the intermediate server
uses the first key buffer as long as the first key buffer contains keys, and
then uses the second key buffer and fills the first key buffer again by a third request to the security server,
wherein the first key buffer and the second key buffer are used cyclically.

5. The process for end-to-end securing of a communication according to claim 1, wherein the session initiation protocol to establish a session is an SIP protocol.

6. The process for end-to-end securing of a communication according to claim 5, wherein
the first session key is sent to the at least one first item of terminal equipment as a value of an attribute named a=hsmkey;
the at least one second session key is sent to the at least one first item of terminal equipment as a value of an attribute named a=crypto;
the first session key is sent to the second item of terminal equipment as the value of the attribute named a=crypto;
the at least one second session key is sent to the second item of terminal equipment as the value of the attribute named a=hsmkey.

7. The process for end-to-end securing of a communication according to claim 1, wherein the communication is a voice communication.

8. The process for end-to-end securing of a communication according to claim 1, wherein the communication is a video communication.

9. A process for end-to-end securing of a communication between at least one first item of terminal equipment and a second item of terminal equipment, the communication being established using a session initiation protocol making it possible to exchange session keys, wherein each item of said at least one first item of terminal equipment and said second item of terminal equipment uses a session key to encrypt communication data that said each item of said at least one first item of terminal equipment and said second item of terminal equipment is transmitting, wherein the session keys are exchanged securely via an intermediate server using a security certificate, wherein via the intermediate server, the process comprising:
receiving a first invitation message of the at least one first item of terminal equipment inviting the second item of terminal equipment, wherein the first invitation message comprises at least one descriptive attribute of a first session key;
producing a second invitation message of the at least one first item of terminal equipment inviting the second item of terminal equipment, wherein the second invitation message comprises
the first session key, the first session key being configured by the intermediate server according to the at least one descriptive attribute of the first session key, the first session key being configured to be used to encrypt and decrypt the communication data transmitted by the at least one first item of terminal equipment;
at least one second session key, the at least one second session key being configured by the intermediate server, the at least one second session key being configured to be used to encrypt and decrypt the communication data transmitted by the second item of terminal equipment;
transmitting the second invitation message;
receiving a first acceptance message of the second item of terminal equipment accepting the second invitation message;
producing a second acceptance message of the second item of terminal equipment accepting the second invitation message, wherein the second acceptance message comprises
the first session key;
the at least one second session key; and
transmitting the second acceptance message;
wherein the first session key or the at least one second session key are configured by a request to a security server configured to implement a random sequence generator, wherein the first session key and the at least one second session key are produced using said random sequence generator; and
wherein the request to the security server allows obtaining a bundle of session keys, wherein the bundle of session keys is stored by the intermediate server in a first key buffer, wherein the first session key and the at least one second session key are configured using contents of the first key buffer, wherein each key stored in the first key buffer are single-use.

10. The process for end-to-end securing of a communication according to claim 9, wherein the intermediate server comprises a second key buffer, wherein the second key buffer is supplied by another request to the security server, wherein the intermediate server
uses the first key buffer as long as the first key buffer contains keys, and
then uses the second key buffer and fills the first key buffer again by a third request to the security server,
wherein the first key buffer and the second key buffer are used cyclically.

11. A process for end-to-end securing of a communication between at least one first item of terminal equipment and a second item of terminal equipment, the communication being established using a session initiation protocol making it possible to exchange session keys, wherein each item of said at least one first item of terminal equipment and said second item of terminal equipment uses a session key to encrypt communication data that said each item of said at least one first item of terminal equipment and said second item of terminal equipment is transmitting, wherein the session keys are exchanged securely via an intermediate server using a security certificate, wherein via the intermediate server, the process comprising:

receiving a first invitation message of the at least one first item of terminal equipment inviting the second item of terminal equipment, wherein the first invitation message comprises at least one descriptive attribute of a first session key;

producing a second invitation message of the at least one first item of terminal equipment inviting the second item of terminal equipment, wherein the second invitation message comprises the first session key, the first session key being configured by the intermediate server according to the at least one descriptive attribute of the first session key, the first session key being configured to be used to encrypt and decrypt the communication data transmitted by the at least one first item of terminal equipment;

at least one second session key, the at least one second session key being configured by the intermediate server, the at least one second session key being configured to be used to encrypt and decrypt the communication data transmitted by the second item of terminal equipment;

transmitting the second invitation message;

receiving a first acceptance message of the second item of terminal equipment accepting the second invitation message;

producing a second acceptance message of the second item of terminal equipment accepting the second invitation message, wherein the second acceptance message comprises the first session key;

the at least one second session key; and transmitting the second acceptance message;

wherein the session initiation protocol to establish a session is an SIP protocol; and wherein the first session key is sent to the at least one first item of terminal equipment as a value of an attribute named a=hsmkey;

the at least one second session key is sent to the at least one first item of terminal equipment as a value of an attribute named a=crypto;

the first session key is sent to the second item of terminal equipment as the value of the attribute named a=crypto;

the at least one second session key is sent to the second item of terminal equipment as the value of the attribute named a=hsmkey.

\* \* \* \* \*